United States Patent [19]

Waldron

[11] 4,277,786
[45] Jul. 7, 1981

[54] MULTI-ELECTRODE LIQUID CRYSTAL DISPLAYS

[75] Inventor: Wesley K. Waldron, Scotia, N.Y.

[73] Assignee: General Electric Company, Schenectady, N.Y.

[21] Appl. No.: 59,275

[22] Filed: Jul. 19, 1979

[51] Int. Cl.³ .............................................. G08B 5/36
[52] U.S. Cl. .................................... 340/765; 340/784; 350/336
[58] Field of Search ................ 340/765, 784; 350/335, 350/336

[56] References Cited

U.S. PATENT DOCUMENTS

| 3,914,019 | 10/1975 | Byatt ........................ 350/336 X |
| 3,989,355 | 11/1976 | Wilmer ....................... 340/784 X |
| 4,137,524 | 1/1979 | Chen et al. ......................... 340/765 |

*Primary Examiner*—David L. Trafton
*Attorney, Agent, or Firm*—Geoffrey H. Krauss; Marvin Snyder; James C. Davis

[57] ABSTRACT

Liquid crystal displays having indicia-forming electrodes arranged in four parallel planes, with all coplanar electrodes in each plane electrically isolated from each other and from the electrodes in the remaining planes and individually energizable for displaying indicia in a multiplicity of different modes, dependent upon the patterns of energization of various electrodes.

11 Claims, 32 Drawing Figures

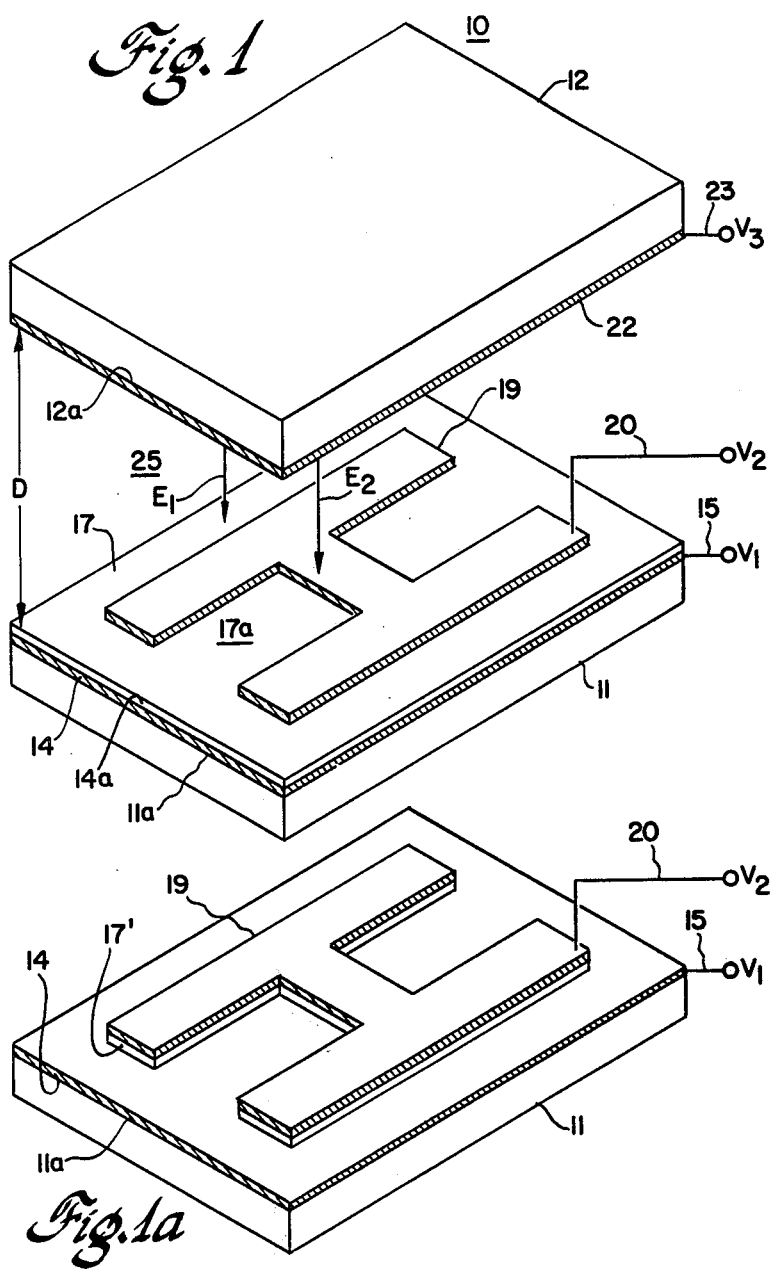
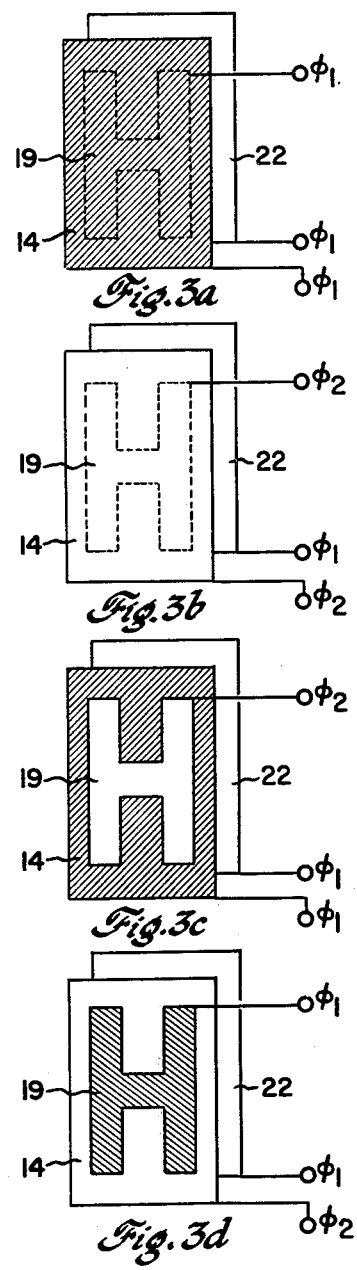
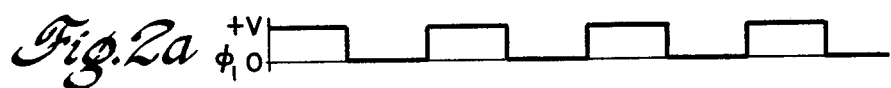
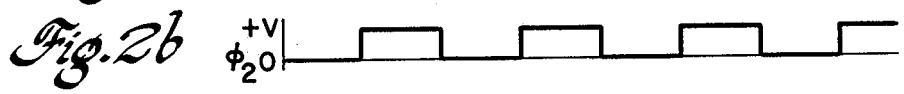
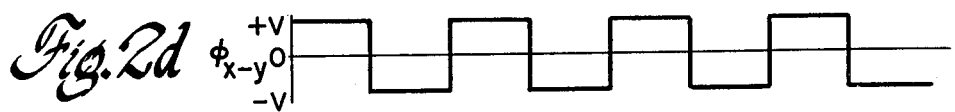

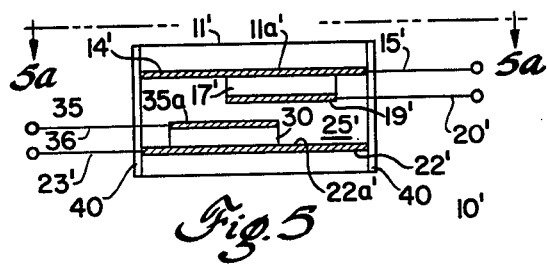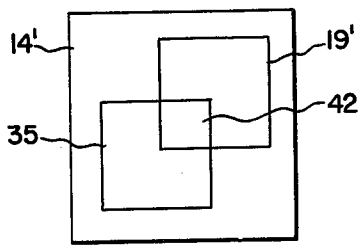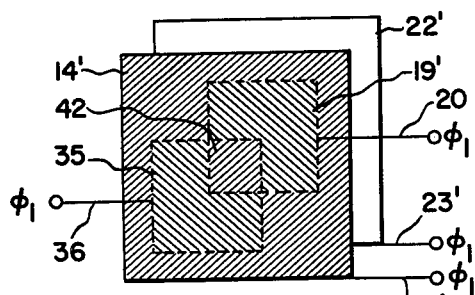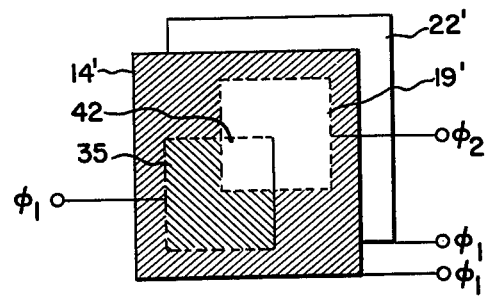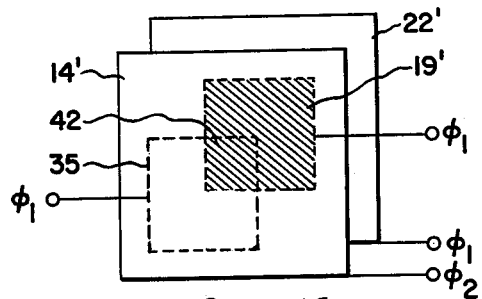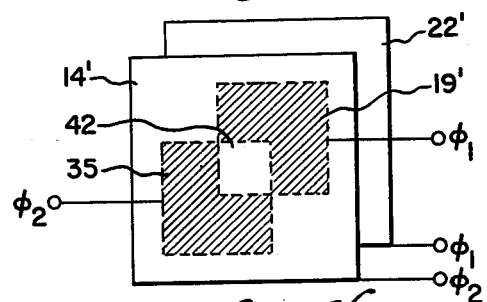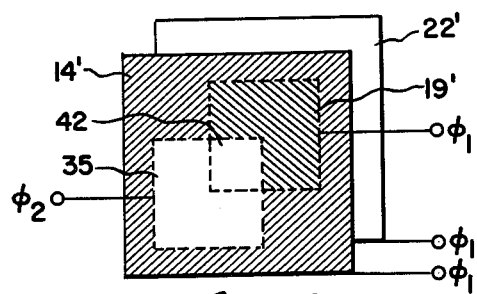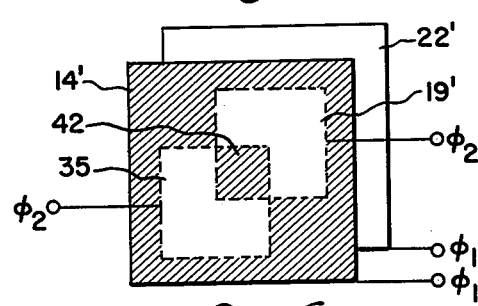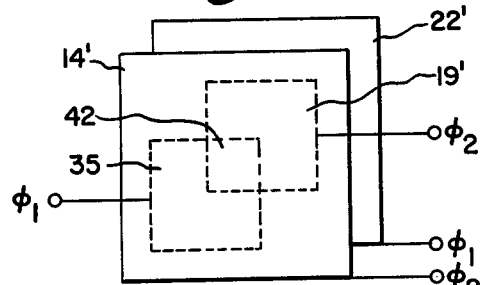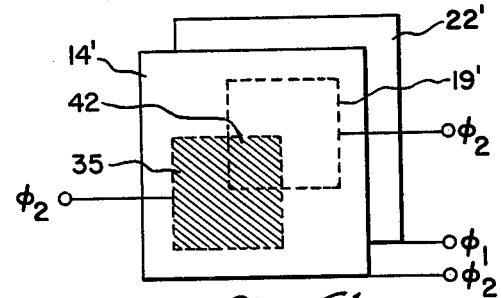

MULTI-ELECTRODE LIQUID CRYSTAL DISPLAYS

BACKGROUND OF THE INVENTION

The present invention relates to liquid crystal displays and, more particularly, to novel liquid crystal displays having a multiplicity of electrodes arranged in at least three planes for displaying a multiplicity of indicia in different formats.

Liquid crystal displays are desirable due to the low power consumption thereof. In many applications, display of relatively large amount of information require that the displays be not only relatively densely packed, but also capable of displaying information in more than one mode. Therefore, liquid crystal displays capable of conveying visual information in several modes are highly desirable.

BRIEF SUMMARY OF THE INVENTION

In accordance with the invention, a liquid crystal display has a multiplicity of electrodes arranged in at least three parallel planes, with the co-planar electrodes being insulated from all other electrodes in that plane and all electrodes in the remaining planes. The electrode planes are arranged adjacent to each of the pair of surfaces of a liquid crystal layer, whereby portions of the layer, defined between electrodes adjacent opposite layer surfaces, are rendered in a first light-transmissive condition only if an electric field of non-zero magnitude is formed through that portion of the liquid crystal layer responsive to driving voltages applied to the various electrodes of the electrode planes adjacent to opposite surfaces of the liquid crystal layer.

In one presently preferred embodiment, three planes of electrodes are utilized, with a pair of electrode planes being positioned adjacent to the viewable front surface of the liquid crystal layer, and with the electrodes selectably driven by waveforms of substantially identical frequency and substantially opposite phase, whereby four different modes of information may be realized for a set of three electrodes, each positioned in a different one of the three electrode planes. In another presently preferred embodiment, four electrode planes are utilized with a first pair of electrode planes being positioned adjacent to the viewable front surface of the liquid crystal layer and an additional pair of electrode planes being positioned adjacent to the rear surface of the liquid crystal layer, and with eight different modes of information display being realizable in a display having one electrode in each of the four different electrode planes, wherein each electrode is selectably driven by a selected one of the afore-mentioned pair of substantially-identical-frequency, substantially-opposite-phase driving waveforms. By placing the plane(s) including electrodes of largest area closest to the liquid crystal layer, the electrode leads may be hidden and do not form visible artifacts.

Accordingly, it is an object of the present invention to provide liquid crystal displays having electrodes arranged in at least three planes parallel to the surfaces of the liquid crystal layer of the display.

This and other objects of the present invention will become apparent to those skilled in the art upon consideration of the following detailed description, when taken in conjunction with the drawings.

BRIEF DESCRIPTION OF THE DRAWINGS

FIG. 1 is an exploded perspective view of a liquid crystal display having three layers of co-planar electrodes, in accordance with the principles of the present invention;

FIG. 1a is a perspective view of a variation of the three-layer, or triode, liquid crystal display of FIG. 1;

FIGS. 2a-2d are graphical illustrations of one possible set of electrode driving waveforms and of the resulting electric field waveforms across the liquid crystal material within the display;

FIGS. 3a-3d are schematic representations of the multiplicity of indicia generated by the triode displays of FIGS. 1 or 1a, for a multiplicity of different combinations of electrode excitation;

FIG. 5 is a sectional sideview of a four-layer or tetrode, liquid crystal display in accordance with the principles of the present invention;

FIG. 5a is a front view of the face of the liquid crystal display of FIG. 5, looking in the direction of arrows 5a-5a;

FIGS. 6a-6h are representations of some of the multiplicity of indicia viewable upon the front surface of the display of FIGS. 5 and 5a, for various different excitation conditions.

DETAILED DESCRIPTION OF THE INVENTION

Figure 1B:
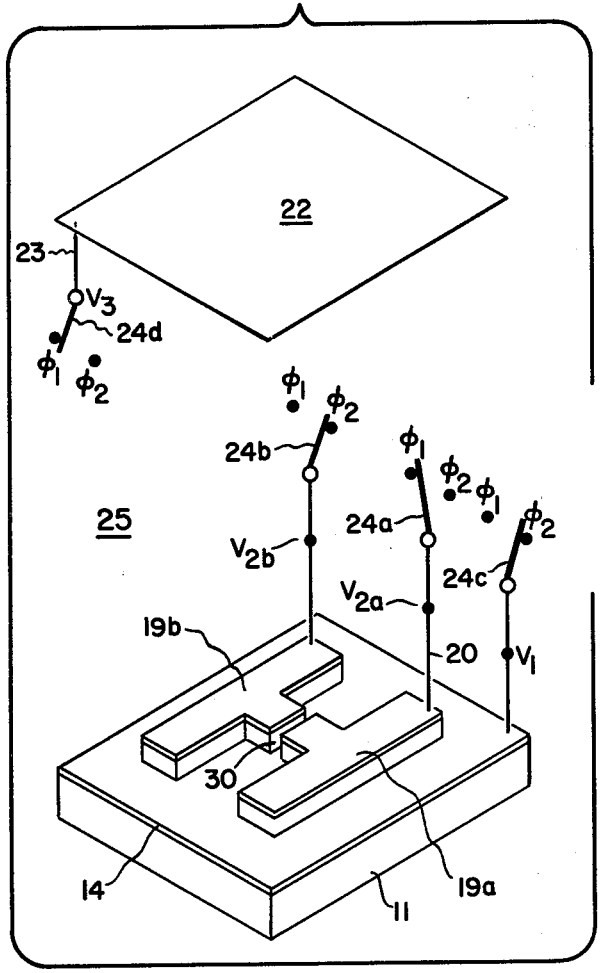
FIG. 1b is a perspective view of a three-layer display having more than one electrode in one of the layers.

Referring initially to FIG. 1, liquid crystal display 10 includes a front substrate 11 formed of an optically transparent material, such as glass and the like, and a rear substrate 12, formed of an insulative material. A first electrode 14, formed of a substantially transparent, conductive material, such as indium oxide, tin oxide, indium tin oxide, and the like, is fabricated to a desired pattern upon the surface 11a of front substrate facing rear substrate 12. In the illustrated example, first electrode 14 is fabricated substantially over the entire front substrate surface 11a. A lead means 15 couples a source (not shown) of a first electrode driving potential $V_1$ to first electrode 14. A layer 17 of a transparent dielectric insulating material is fabricated upon first electrode 14, opposite front substrate 11. A second electrode 19, formed of a substantial transparent and conductive material, is fabricated in a desired pattern upon the surface 17a of insulative layer 17 furthest from first electrode 14. Second electrode 19 advantageously has an area less than the area of first electrode 14, whereby at least a portion of first electrode 14 is not overlaid by any portion of second electrode 19. Another lead means 20 connects a source (not shown) of a second electrode driving potential $V_2$ to second electrode 19. A rear, or third, electrode 22 is fabricated upon the surface 12a of rear substrate 12 facing front electrode 11. Dependent upon the type of display to be fabricated, conductive electrode 22 may have a highly reflective finish on the surface thereof closest to front substrate 11, if a reflective liquid crystal display is desired, or conductive electrode 22 may be substantially transparent, with rear substrate 12 also being a substantially transparent material, if a transmissive display is desired. The substrates are aligned substantially parallel to one another, whereby each of the plurality (e.g. three) of electrodes are each located in a plane substantially parallel to, but spaced from, the planes of the remaining (e.g. two) electrodes. The spacing between first and second electrodes 14 and 19 is determined by the thickness of insulative layer 17, which is advantageously a thin dielectric layer of silicon dioxide having a thinness of between about 500 angstroms and about 10,000 angstroms; the spacing distance D between the facing surfaces of the first and third electrodes 14 and 22, respectivey, is established at a much greater distance, typically on the order of 10-20 microns, as required for the thickness of a layer of liquid crystal material 25 filling the volume between the front and rear substrates and the electrodes fabricated upon the interior surfaces thereof. While not shown in the figures, which are of exaggerated dimensions for the purposes of illustration, suitable gasket means are utilized in manner known to the art, as about and between the peripheries of the substrates, to seal liquid crystal material 25 between the substrates. It should be understood that while the use of a dichroic liquid crystal material, preferably having a host nematic liquid crystal material of positive dielectric anisotropy, in which a guest dichroic dye is dissolved, is utilized for purposes of illustration herein, other forms of liquid crystal material, with or without dissolved dichroic dyes and the like coloring agents, may be equally as well utilized, as long as the liquid crystal material behaves in such manner as to facilitate transmission of light through the liquid crystal layer in response to either the presence or absence of an electric field through the liquid crystal layer, and prevents substantial transmission of light through the liquid crystal layer in response to the remaining one of the presence and absence of electric field conditions through the liquid crystal layer.

Further, it should be understood that the insulative layer 17 need separate only the second electrode 19 from first electrode 14, and need not extend over portions of the first electrode 14 which do not have a portion of second electrode 19 positioned thereover. As shown in FIG. 1a, insulative layer 17' is positioned only between first electrode 14 and second electrode 19 and has the same shape as second electrode 19 fabricated thereover; the remaining portions of first electrode 14 do not have insulator thereover. The presence of insulator layer 17' only where bounded on opposite sides by first and second electrode layers 14 and 19 gives uniform transmissitivity over all areas of the liquid crystal display cell when excitation voltages of minimum amplitude are utilized.

The light transmissitivity of the liquid crystal layer 25 is controlled by the electric field across each portion thereof, which electric field is generated by the voltage difference between the voltage upon rear, or control, electrode 22, in abutment with one surface of the liquid crystal layer, and the voltages upon each of the first and second electrodes 14 and 19. While the establishment of a voltage difference between electrodes 14 and 22, or electrodes 19 and 22, may be effected in a wide variety of different manners, for the purposes of illustration, the use of two driving square-wave forms, of opposite phase, is shown. Thus, the first driving waveform $\phi_1$ (FIG. 2a) is a square-wave having an amplitude periodically varying between zero and $+V$ volts, while the second driving waveform $\phi_2$ (FIG. 2b) is a square-wave of identical frequency and amplitude, and having a 180° phase-shift with respect to first driving waveform $\phi_1$. The voltage across liquid crystal layer 25, being equal to the difference between the instaneous magnitudes of the waveforms driving the electrodes upon opposite surfaces of each portion of the liquid crystal layer, has a zero magnitude when the opposed electrodes are driven by in-phase voltages, designated as $\phi_{x\text{-}x}$ in (FIG. 2c), where x is either 1 or 2. That is, if both opposed electrodes are driven by the same driving waveform, be it either the $\phi_1$ or $\phi_2$ waveform, the resulting electric field across the liquid crystal layer has zero magnitude. Conversely, when one of the pair of opposed electrodes bounding the liquid crystal layer is driven by a first one of the pair of driving waveforms $\phi_1$ and $\phi_2$, and the remaining bounding electrode is driven by the remaining driving waveform, $\phi_2$ or $\phi_1$, respectively, then the electric field across the liquid crystal layer is of non-zero magnitude and has a square waveshape of frequency equal to the frequency of the driving waveforms, with the RMS magnitude of the field being related to the peak difference between the instantaneous driving wave amplitude. Thus, as shown on FIG. 2d, the electric-field-producing voltage $\phi_{x\text{-}y}$ across the liquid crystal layer is a square-wave switching between peak values of $+V$ and $-V$ volts, i.e. a wave-form with a peak-to-peak value of 2 V, and has a RMS value of V volts, with a DC component of zero volts magnitude (as required to prevent permanent polarization effects in the liquid crystal material). If the driving waveform peak voltage V is chosen to be greater than a threshold voltage $V_{th}$ of the liquid crystal material, the liquid crystal material may be in a first light-transmissivity condition (e.g. light-absorptive) for the zero field condition (FIG. 2c) when both opposed electrodes are driven in phase, and will be in the opposite light transmissitivity, (e.g. light-transmissive condition) when the opposed electrodes receive driving waveforms of opposite phase (FIG. 2d). The light transmissitivity condition of each portion of a display, bounded by different front electrodes 14 or 19, depends upon the relationship of the driving voltage waveform applied thereto, with respect to the driving voltage waveform applied to the counter electrode 22.

Referring now to FIGS. 3a-3d, the various combinations of driving waveforms applied to the three electrodes, each existing in a separate plane with respect to the other two electrodes, is considered. In FIG. 3a, all three electrodes are driven with the $\phi_1$ waveform; thus, the magnitude of electric field vector $E_2$ (FIG. 1), between control electrode 22 and second electrode 19, is zero. Therefore, the liquid crystal material of that portion of layer 25 between electrodes 19 and 22 remains in its initial condition, which is illustratively assumed to be the light-absorptive condition (as established by electrode-liquid crystal layer boundary means known to the art). Thus, the portion of the display front surface bounded by electrode 19 (shown in broken line), which electrode is behind electrode 14, appears as a "dark" area. Similarly, the electric field vector $E_1$ (FIG. 1) between first front electrode 14 and control electrode 22, is of zero magnitude, as both electrodes 14 and 22 are driven by substantially equal amplitude, in-phase voltages. Accordingly, the portions of the display defined by portions of liquid crystal layer 25 bounded by electrodes 14 and 22 are also in the light-absorptive, or "dark", condition and the entire display is in a first, or entirely dark, display state.

In FIG. 3b, the first driving waveform $\phi_1$ drives control electrode 22, while both first and second front electrodes 14 and 19 are driven by the second driving waveform $\phi_2$. The first electric field vector $E_1$, between first front electrode 14 and control electrode 22, is of non-zero magnitude, as the driving waveforms applied to the electrodes 14 and 22 are of opposite phase (FIG. 2d). Accordingly, the liquid crystal material of layer 25 therebetween is switched to the light-transmissive condition, whereby the area defined by first front electrode 14 is controlled to the "bright" condition. Similarly, as the voltages between second front electrode 19 and control electrode 22 are of opposite phase, field $E_2$ is of sufficient magnitude to reorient the molecules of those portions of liquid crystal layer 25 between second front and control electrodes 19 and 22 render the same portions in the light-transmissive, or "bright", condition, whereby the entire front surface of the display appears in a bright, or second display state.

In FIG. 3c, first driving waveform $\phi_1$ is applied to first front electrode 14 and rear electrode 22, while second driving waveform $\phi_2$ is applied to second front electrode 19. Field $E_2$ is of non-zero magnitude, due to the phase difference between the $\phi_1$ and $\phi_2$ waveforms driving respective electrodes 22 and 19, whereby the portions of liquid crystal layer defined therebetween are rendered into the light-transmissive, or "bright", condition. Field $E_1$ is of substantially zero magnitude, due to driving the rear electrode and the first front electrode, over portions of the latter not shielded by the pattern of second front electrode 19, with driving waveforms of like phase and amplitude. Accordingly, the areas of liquid crystal material layer 25 defined by first front electrode 14, outside the areas of second front electrode 19, are in the quiescent, light-absorptive (or dark) condition, whereby a bright indicia (illustrated as the letter H) appears against a dark background, in a third display state.

As seen in FIG. 3d, second front electrode 19 and rear electrode 22 are both driven by the same waveform, the first driving waveform $\phi_1$, with first front electrode 14 being driven by the remaining driving waveform, i.e. second driving waveform $\phi_2$. Electric field vector $E_1$, between first front electrode 14 and rear electrode 22, is of non-zero magnitude, due to the phase difference between the respective driving voltages. The liquid crystal material of layer 25 should accordingly be in the energized condition, whereby layer 25 is in a light-transmissive condition. This condition actually obtains for those portions of the liquid crystal layer bounded only by portions of front electrode 14. The remaining portions of layer 25, bounded most closely by second front electrode 19, have electrode field factor $E_2$ of substantially zero-magnitude therethrough, due to the application of like-phase waveforms, of substantially identical amplitudes, between the second front electrode 19 and rear electrode 22 bounding those portions of layer 25, whereby second front electrode 19 acts as an electric shield between first front electrode 14 and second rear electrode 22, rendering the liquid crystal layer portions under second front electrode 19 in the quiescent or light-absorptive condition. Therefore, a "dark" indicia (in the form of the letter H) is formed against a bright background, for a fourth display state.

Summarizing, the indicia-forming capabilities of the triode, or three-planar-electrode-layer, display of FIG. 1, facilitate a total number of indicia-forming states established by the number of front electrodes. Thus, for two front electrodes, the display has two viewable areas (that area defined by the innermost front electrode and a second area defined by the area of the outermost electrode exclusive of that area covered by the innermost electrode). Each of the two areas thus defined may be in either the light-transmissive, or bright, condition or in the light-absorptive, or dark, condition whereby a total of four display states may be realized. It should be understood that driving the rear electrode 22 with the opposite phase waveform $\phi_2$ acts to reverse the bright and dark areas of the display. That is, if $V_3 = \phi_2$ in FIG. 3a, then the entire display will be in the bright condition (as in FIG. 3b). If, in FIG. 3b, $V_3 = \phi_2$, then the display will be entirely dark (as in FIG. 3a). If $V_3 = \phi_2$, the representations of FIGS. 3c and 3d would be likewise interchanged. This provides a convenient mechanism for "flashing" the display, to attract attention, while maintaining the displayed indicia, by periodically reversing the waveform supplied only to one electrode, i.e. rear electrode 22.

Figure 4B:
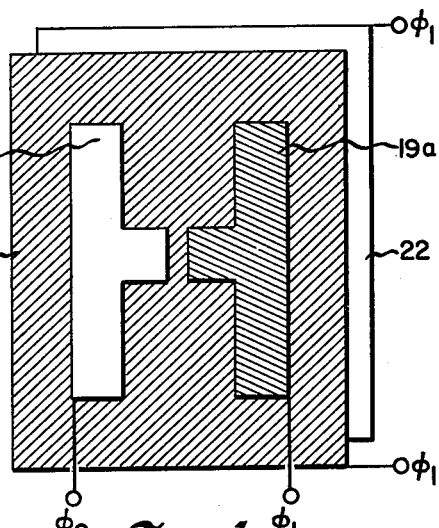
FIGS. 4a-4j are schematic representations of a selected subset of the multiplicity of indicia generated by the display of FIG. 1b.
Figure 4C:
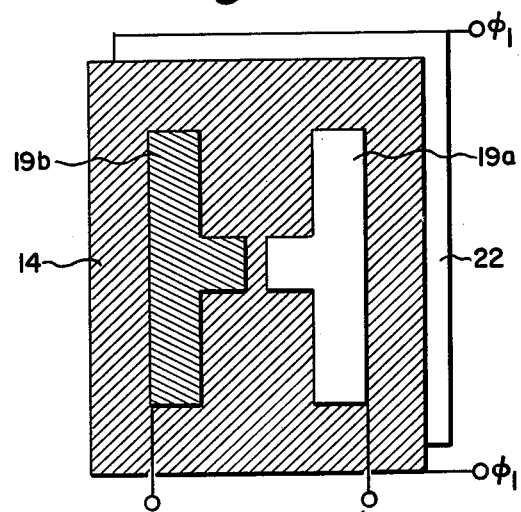
Figure 4A:
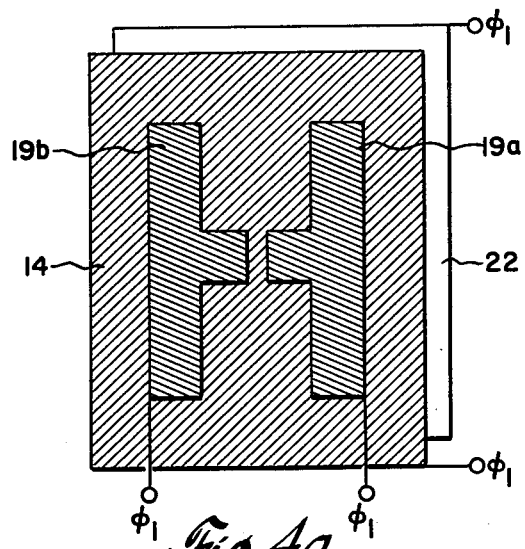
Figure 4D:
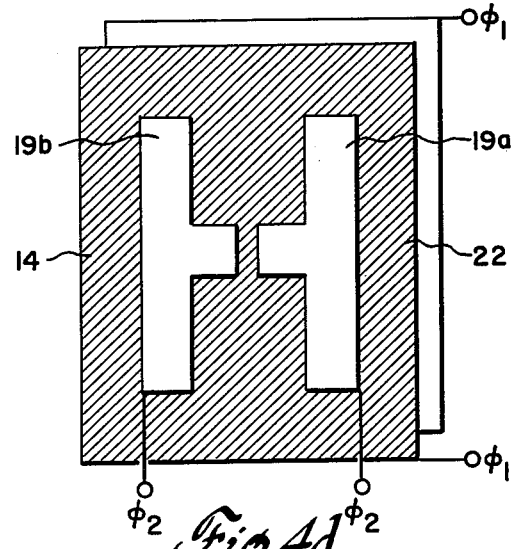
Figure 4E:
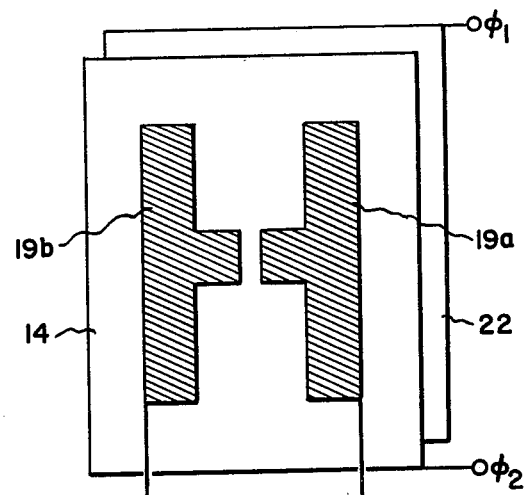
Figure 4H:
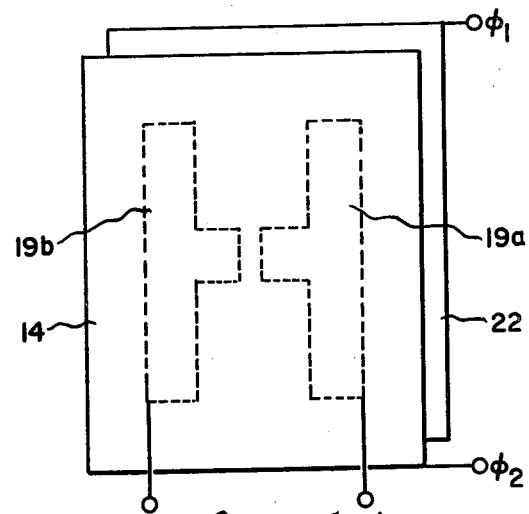
Figure 4F:
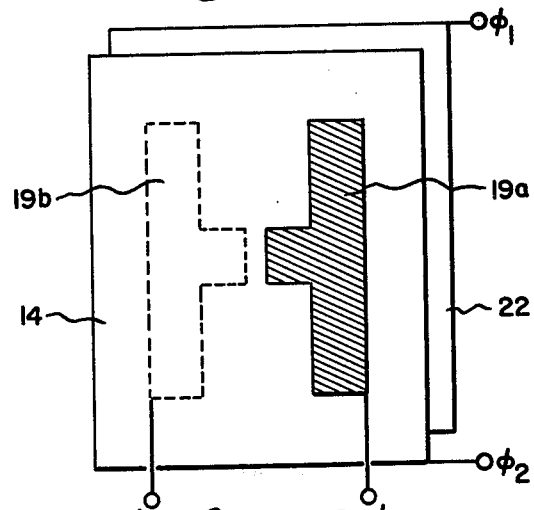
Figure 4I:
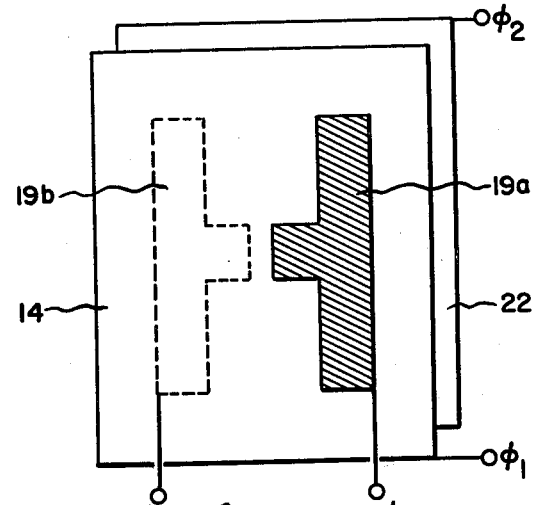
Figure 4G:
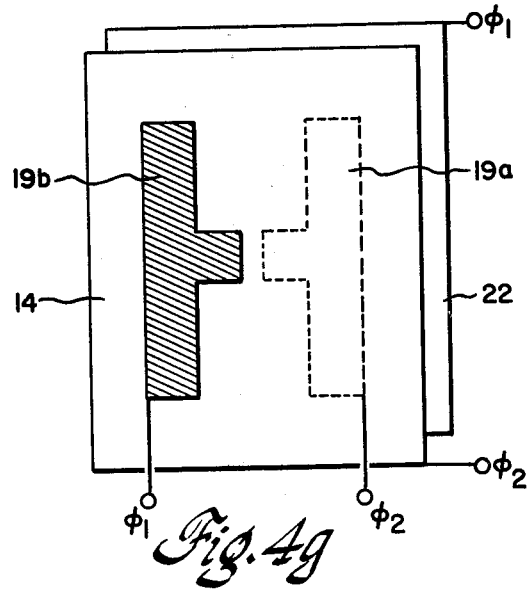
Figure 4J:
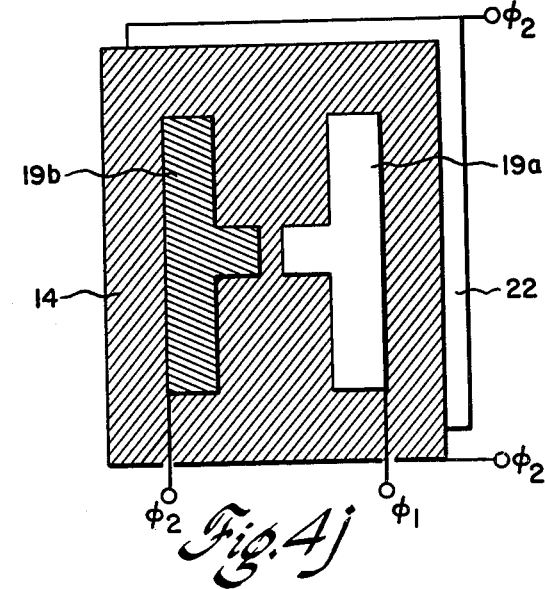

If the innermost electrode plane is occupied by more than one second front electrode 19, each insulatively spaced from the other, then the number of display states increases by a factor of two for each additional second-layer electrode segment. Thus, in FIG. 1b, wherein all other elements are similar to the elements of FIG. 1a, second front electrode 19 has been split, along line 30, into two second front electrodes segments 19a and 19b, respectively, each coupled to independently switchable driving potentials $V_{2a}$ and $V_{2b}$, via respective lead means 20 and 20' and associated switch means 24a and 24b, with first front electrode 15 and rear electrode 22 also selectively coupled to one of the $\phi_1$ and $\phi_2$ waveforms via associated switch means 24c and 24d. A total of eight different indicia may be formed, as shown in FIGS. 4a–4j. Thus, if switch means 24d couples the $\phi_1$ waveform to rear electrode 22, and switch means 24c couples the $\phi_1$ waveform to first front electrode 14, the actuation of switch means 24a and 24b to couple the $\phi_1$ waveforms to both second front electrode segments 19a and 19b results in all front electrodes 14, 19a and 19b being driven in-phase with the waveform driving the rear electrode, whereby the fields through the liquid crystal layer have an essentially zero magnitude and the entire viewable face of the display is dark (FIG. 4a). In FIG. 4b, switch means 24b has been operated to couple the $\phi_2$ waveform to second front electrode segment 19b, whereby a non-zero magnitude field exists across the portion of the liquid crystal layer bounded by that electrode segment and provides a bright portion in an otherwise dark display. FIG. 4c, switch means 24a has been operated to couple the $\phi_2$ waveform to second front electrode segment 19a, with second front electrode segment 19b receiving the $\phi_1$ waveform, whereby the portion of the liquid crystal layer beneath electrode segment 19a transmits light and provides a bright display portion, with the remainder of the display being in the darkened condition. In FIG. 4d, switch means 24a and 24b have been operated to provide the $\phi_2$ waveforms to both second front electrodes segments 19a and 19b, which segments appear bright against a dark background, due to the driving of first front electrode 14 in-phase with rear electrode 22. In FIGS. 4e–4h, the front electrode 14 is driven with opposite phase from the waveform driving rear electrode 22, by operation of switch means 24c, while second front electrode segments 19a and 19b are driven with the various possible combinations of the $\phi_1$ and $\phi_2$ waveforms. As seen in these figures, even though the phase difference between the first front electrode 14 and rear electrode 22 should, if second front electrode segments 19a and 19b were not present, provide a completely bright viewable display surface, the presence of either, or both, of the second front electrode segments driven with a waveform having the same phase as the rear electrode, provides a shielding action and causes the portion of the viewable surface defined by the second front electrode segment driven in-phase with the rear electrode, to be dark in an otherwise bright display. In FIGS. 4i and 4j, switch means 24d has been operated to couple the $\phi_2$ waveform to rear electrode 22. If first front electrode 14 is driven by the $\phi_1$ waveform (FIG. 4i), the display is bright, except in those second front electrode segments (e.g. 19a) receiving the $\phi_2$ waveform, whereby the in-phase driving waveform and the shielding action of the second electrode layer cause a dark display portion to appear. Where the first front electrode (FIG. 4j) is driven in-phase with the $\phi_2$ waveform driving the rear electrode, the display appears in the normally dark condition, except for those portions defined by one of the second front electrode segments (e.g. 19a) having the opposite phase waveform, from the rear electrode waveform, which appears in the bright condition.

The plurality of parallel planar electrode layers may be adjacent to the rear surface of liquid crystal material layer 25, with a single front electrode layer. A plurality of electrode layers may be positioned adjacent to each of the opposed surfaces of the liquid crystal layer, as in the display 10' illustrated in FIGS. 5 and 5a. Display 10' is illustratively a reflective liquid crystal display, having a substantially transparent, insulative front substrate 11' upon the entire interior surface 11a of which is fabricated a first front transparent electrode 14'. A transparent dielectric layer 17", fabricated upon a portion of the interior surface of first front electrode 14', supports a transparent second front electrode 19'. A first rear electrode 22' is formed of a conductive material having, in a reflective display, a highly reflective surface 22a' positioned towards front substrate 11' in this embodiment, the rear substrate function is performed by fabricating rear electrode 22' to a sufficient thickness to realize the required rigidity of the rear-most member. A layer 30 of transparent dielectric material is fabricated upon a portion of first rear electrode front surface 22a to support a second rear electrode 35, in manner similar to the manner in which second front electrode 19' is supported upon the interior surface of first front electrode 14' by dielectric layer 17". In a reflective display, the first surface 35a, of the second rear electrode, also has a highly reflective finish. Lead means 15', 20', 23', and 36 are respectively provided for respective first front electrode 14', second front electrode 19', first rear electrode 22' and second rear electrode 35, for coupling to electrode driving waveforms $V_1$, $V_2$, $V_3$ and $V_4$, respectively. The volume bounded on a first side by first and second front electrodes 14' and 19' and front insulator 17", and on a second side by first and second rear electrodes 22' and 35 and by insulative layer 30, as filled with liquid crystal material 25', and retained therein by suitable gasket means 40.

As seen through substantially transparent front substrate 11', the first front electrode 14' (FIG. 5a) covers the entire front surface of the display, with second front and rear electrodes 19' and 35, respectively, forming areas therein, which in the illustrated embodiment overlap and form an overlap area 42. It should be understood that each of leads 15', 20', 23' and 36 may be coupled via suitable switch means (not shown) to sources (also not shown) of different driving waveforms. For purposes of explanation, the opposed-phase, substantially equal amplitude square-waves of FIGS. 2a and 2b are utilized as driving waveforms.

In operation, the viewable surface of display 10', i.e. the exterior surface of substantially transparent substrate 11', is e.g. in a dark condition (the light-absorptive state) if a field of magnitude less than the liquid crystal material threshold field is provided in the liquid crystal material layer portion between opposed electrodes, and is in the bright condition (the light-reflective state) if a field of magnitude greater than the threshold field is provided through an associated portion of the liquid crystal material, as by driving each of an opposed pair of electrodes with opposite-phase waveforms. Illustratively, in FIGS. 6a, all of electrodes 14', 19', 22' and 35 are driven by the $\phi_1$ waveform. The in-phase driving waveforms between either of the first and second front electrodes 14' and 19' and either of the first and second rear electrodes 22' and 36 provide a substantially zero magnitude field through all portions of the liquid crystal material, causing the liquid crystal material to remain in its initial condition, which is assumed to be the light-absorptive state, whereby the entire display appears in the "dark" condition, for a first display state.

In FIG. 6b, the driving voltage on the first front electrode 14' is switched to the $\phi_2$ waveform, of opposite phase to the waveforms driving second front electrode 19' and both rear electrodes 22' and 35. With opposite-phase drive between the first front and both rear electrodes, the entire surface of the display should normally be in the "bright" condition, except for the area of the second front electrode, which is driven with a waveform of identical phase to the waveform of the electrodes on the opposite side of the liquid crystal layer. Thus, as second front electrode 19 is driven with the $\phi_1$ driving waveform, of identical phase to the $\phi_1$ waveforms driving both rear electrodes, the portion of the liquid crystal layer bounded by the area of second front electrode 19 has an electric field of substantially zero amplitude therethrough and appears in the light-absorptive, or "dark", condition whereby a dark square formation appears in the upper-right-hand corner of an otherwise bright display.

In FIG. 6c, the second rear electrode 35 is driven by the $\phi_2$ waveform, while the remaining three electrodes are driven with the $\phi_1$ waveform. The area delineated by second rear electrode 35 is the only area in which opposite-phased waveforms provide a non-zero electric field through the intermediate liquid crystal layer and provide a light-transmissive, or "bright", area on an otherwise dark display. In FIG. 6d, the two front electrodes are driven with identical waveform phase, while both rear electrodes are driven with the opposite phased waveform, whereby the electric field through all portions of a liquid crystal layer between the front and rear electrodes has an electric field sufficient to render the layer in the light-transmissive condition and the display has the entire viewable surface thereof in the bright state.

In FIG. 6e, the first front and rear electrodes are driven with the $\phi_1$ driving waveform, as is the second rear electrode 35. Second front electrode 19' receives the $\phi_2$ driving waveform and, as the driving waveform thereof is out-of-phase with the waveform driving both rear electrodes, the area delineated by second front electrode 19' is in the bright condition. The remaining viewable surface of the displays in the darkened condition, due to the in-phase driving waveforms applied between the electrodes adjacent the surfaces of the liquid crystal layer thereat. In FIG. 6f, the first rear electrode 22' and the second front electrode 19' are driven with the $\phi_1$ waveform, while first front electrode 14' and second rear electrode 35 are driven with the oppositely-phased $\phi_2$ waveform. The liquid crystal material in area 42, formed by the overlap between second front rear electrodes 19' and 35, respectively, is thus driven by electrode portions having oppositely-phased waveforms thereon and appears in a bright condition. The liquid crystal layer area bounded by the remainder of second front electrode 19' on the front surface thereof, and by first rear electrode 22' on the second surface thereof, has an electric field of substantially zero magnitude formed therethrough and is, accordingly, in the light-absorptive, dark condition. Similarly, the portion of the liquid crystal layer bounded on the front side by first front electrode 14' and on the rear surface by the remaining portion of second rear electrode 35, exclusive of overlap portion 42, is driven by in-phase $\phi_2$ voltages and is in a dark condition. The remaining portion of the liquid crystal layer, bounded by first front and rear electrodes 14' and 22' exclusive of areas delineated by either of second front and rear electrodes 19' and 35, is driven by opposite-phase waveforms and is in the bright condition.

In FIG. 6g, both front and rear first electrodes 14' and 22' are driven with identically-phased $\phi_1$ waveforms, while both front and rear second electrodes 19' and 35 are driven by in-phase $\phi_2$ waveforms. In the region 42 of overlap between second front and rear electrodes 19' and 35', the electric field is substantially zero, due to driving both second front and rear electrodes with like $\phi_2$ waveforms; area 42 is thus in a darkened position. The remaining area of second front and rear electrodes 19' and 35, exclusive of overlap area 42, are opposite portions of the first rear and front electrodes 22' and 14', respectively, having oppositely-phased driving voltages thereon and accordingly are in the bright condition. The remaining portions beyond the periphery of the second front and rear electrodes are in the dark condition, as first front and rear electrodes 14' and 22' are driven with in-phase waveforms.

In FIG. 6h, the first front and rear electrodes are driven with oppositely phased waveforms, while the second rear electrode 35 is driven with the same phase waveform as the first front electrode 14'. The second front electrode 19' is also driven with the $\phi_2$ waveform, out-of-phase with the first rear electrode 22'. Accordingly, the area delineated by second rear electrode 35' is in the dark condition while the remainder of the viewable surface of the display is in the bright condition. It should be understood that the eight examples of different indicia formed with the tetrode (four electrode plane) device are not completely exhaustive of the possible combinations. Similarly, by placing more than one electrode in each of the four electrode layers, even larger combinations of indicia may be formed.

Figure 7:
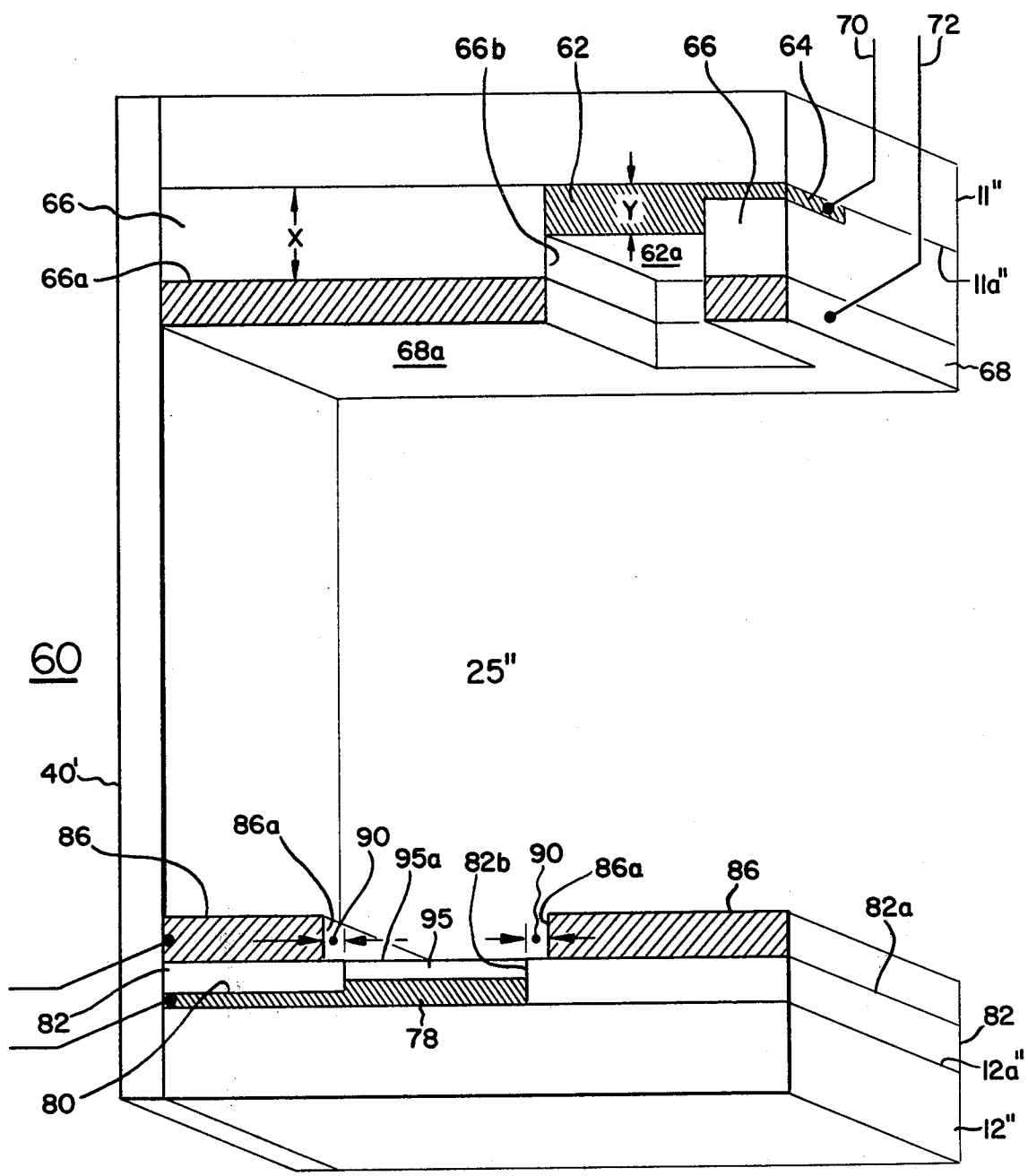
FIG. 7 is a sectional perspective view of a portion of a tetrode display in which display electrode leads are effectively hidden.

Referring to FIG. 7, a presently preferred tetrode display 60 has the planes of electrodes of greatest area positioned closest to the surfaces of the liquid crystal layer, to provide invisibility of the various electrode leads, thus substantially preventing formation of visible artifacts by the leads when energized. The front substrate 11" is again fabricated of a member of transparent insulator material, such as glass and the like. Upon the interior surface 11a" of the front substrate is fabricated a first plane of at least one conductive electrode 62, having a conductive lead 64 integrally joined thereto and also fabricated upon front substrate interior surface 11a". The thickness of the lead 64 and the electrode 62 of the first front electrode plane may be of the same thickness or may be, as illustrated, of different thicknesses. A layer 66 of transparent insulative material is deposited upon that portion of the area of front substrate interior surface 11a" not covered by first front plane electrode 62; the area covered by the lead 64 associated with the electrode 62 of the first front electrode plane are also covered by the insulative material of layer 66. Thus, the layer 66 of insulator material has a thickness X greater than the thickness Y of electrodes 62 (and also of lead 64) and provides a substantially planar dielectric layer interior surface 66a having an aperture 66b formed therein over the first electrode plane electrode 62 and of substantially identical size and shape. A second plane of at least one electrode 68 is fabricated upon interior insulative layer surface 66a. Electrode 68 may be a single electrode, having apertures therethrough, and of area and size, in registration with the electrode 62 of the first front electrode plane, or may be a plurality of electrodes configured to a desired pattern, but devoid of second front electrodes in those areas behind which first front electrodes 62 are positioned. Advantageously, the electrode area of the second front electrode plane electrode 68 is greater than the area of the electrode 62 of the first front electrode plane. The liquid crystal material 25" is adjacent to the interior surface 68a of the electrodes of the second front electrode plane, fills the apertures 66b in the dielectric layer 66 and is adjacent to the interior surface 62a of first front plane electrodes 62. Liquid crystal material 25" is retained by gasket 40'. Wire leads 70 and 72, respectively connected to lead 64 in the first front electrode plane and directly to electrode 68 in the second front electrode plane, are utilized to impress suitable operating potential on the respective electrodes.

It will be seen that this embodiment provides for leads, e.g. lead 64, of electrode areas positioned within the middle of the total viewable area of the display, to be located "behind", with respect to liquid crystal layer, other electrodes, e.g. electrode 68 in the second front electrode plane. Thus, the electrical potential carried to electrode 62 of the first front electrode plane via lead 64, is shielded from the liquid crystal layer by electrode 64, whereby an electric field cannot be formed thru the liquid crystal layer between any of first front electrode layer leads 64 and a rear electrode or lead thereof, as the electric field lines from any first front electrode plane lead 64 terminate at the overlying second front electrode 68. Accordingly, visible artifacts are not produced by a potential on any of first front electrode plane leads 64, which leads are formed of a substantially transparent conductor material, allowing light to pass therethrough, when the display is in operation.

A rear substrate 12" may have a single rear electrode layer (for a triode display configuration), a pair of substantially parallel rear electrode planes (as in display 10' of FIG. 5) or some greater number of substantially parallel planes of electrodes. In a display having more than one plane of rear electrodes, the multiple rear electrode planes are advantageously positioned similar to the front planes of electrodes 62 and 68 in display 60, i.e. with the electrodes of greatest extent being adjacent to the rear surface of liquid crystal layer 25' to provide shielding for the leads of other rear planes of electrodes successively further toward the rear of the display with respect to the liquid crystal layer rear surface. As seen in FIG. 7, at least one electrode 78 is fabricated upon the surface 12a'' of the rear substrate. A conductive lead 80 is also deposited upon rear electrode surface 12a'' and joined to an associated electrode 78 in the first rear electrode plane. Similar to the front substrate-electrode structure, a layer 82 of a substantially transparent dielectric material is deposited over that portion of the front surface 12a'' of the rear substrate, which is not covered by one of electrode 78 of the first rear electrode plane. At least one electrode 86 of a second rear electrode plane, adjacent to the rear surface of liquid crystal layer 25'', is deposited upon the insulation layer surface 82a furthest from substrate 12'', with shape and area as desired for displaying particular combinations of indicia. Advantageously, the edge 86a of second rear plane electrodes 86 does not extend to the sides of the aperture 82b formed in dielectric layer 82 above first rear plane electrodes 78. The small strip 90 of insulation layer surface 82a not covered by second rear plane electrodes 86 provides an area substantially devoid of electrodes, whereby an electric field cannot be formed above each of strips 90, regardless of the potential upon any electrodes in the electrode planes fabricated upon the opposite substrate, and always provide a corresponding strip of the viewable surface of the display which is in the "dark" condition. If potentials on adjacent electrodes are such that the liquid crystal material layer portions associated with the adjacent electrodes is in a "dark" condition, the dark strips 90 blend in with the dark background. If the potentials upon electrodes adjacent to a strips 90 are such that light is transmitted through the portions of liquid crystal layer associated with the adjacent electrodes, the strip appears as a dark border about the "bright" portions of the viewable display face associated with the adjacent electrodes. In this manner, additional information-display states may be provided by the multi-layer displays of the present invention. If desired, the dielectric layer 82 may be fabricated to include a layer portion 95 covering the electrodes 78 of first rear electrode plane, and to such depth that the surface 95a thereof is co-planar with the dielectric layer surface 82a. The variations in thickness of liquid crystal layer 25', between portions of the various electrode planes fabricated on the opposed substrates, is thus reduced to facilitate comparable optical effects through any portion of the liquid crystal layer. The electrode leads 80 remain substantially shielded behind electrodes 86, in a plane closer to the surface of the liquid crystal layer, and substantially avoid formation of visual artifacts due to the potentials carried upon leads 80.

It should be understood that the various layers of electrodes fabricated upon the interior surfaces of either or both substrates may be formed with the plane of largest electrode area adjacent to the liquid layer surface and with or without strips 90, substantially devoid of electrodes.

While the present invention has been described with reference to several presently preferdent embodiments thereof, many modifications and variations will now become apparent to those skilled in the art. It is my intent, therefore, to be limited only to the scope of the appending claims, rather than for by the specific details disclosed herein.

What is claimed is:

1. A visual information display comprising:
   a layer of liquid crystal material having opposed first and second surfaces, said liquid crystal material layer characterized by absorption therein and transmission therethrough of light incident upon one of said layer surfaces responsive respectively to first and second magnitudes of an electric field formed through a portion of said layer;
   four planes each having at least one substantially transparent electrode therein, each electrode being insulated from the remainder of said electrodes, each of said electrode planes being arranged substantially parallel to each other and to said surfaces of said liquid crystal layer, with first and second planes of electrodes being sequentially positioned outwardly adjacent to said first surface of said liquid crystal layer, with said second electrode plane between said first electrode plane and said first liquid crystal layer surface, and third and fourth planes of electrodes being sequentially positioned outwardly adjacent to the second liquid crystal layer surface, with said third electrode plane between said liquid crystal layer second surface and said fourth electrode plane;
   a layer of insulating material positioned at least between the electrodes of each pair of electrode planes positioned outwardly adjacent to each of said first and second surfaces of said liquid crystal layer; and
   means for independently coupling selected ones of a plurality of driving waveforms to each of the electrodes of said four electrode planes to cause a portion of said liquid crystal material layer between any electrode adjacent to said first liquid crystal layer surface and any electrode adjacent to said liquid crystal layer to be switchable between a light-absorptive and a light-transmissive condition.

2. The display as set forth in claim 1, wherein the area of the electrodes in the second layer plane is less than the area of the electrodes in the first electrode plane.

3. The display as set forth in claim 1, wherein the area of the electrodes in the second layer plane is greater than the area of the electrodes in the first electrode plane.

4. The display as set forth in claim 1, wherein the area of the electrodes of the third electrode plane is less than the area of the fourth electrode plane.

5. The display as set forth in claim 1, wherein the area of the electrodes of the third electrode plane is greater than the area of the fourth electrode plane.

6. The display as set forth in claim 1, wherein at least one of said first through fourth electrode planes includes a plurality of electrode portions each insulated from the other and independently receiving driving waveforms.

7. The display as set forth in claim 1, wherein all of said first through fourth electrode planes include pluralities of electrode portions insulated from one another and independently driven by driving waveforms.

8. The display as set forth in claim 1, wherein a portion of each electrode plane is devoid of an electrode and at least a part of the electrodeless portions of all of said electrode planes outward from one surface of said liquid crystal layer are in registration.

9. The display as set forth in claim 1, wherein said coupling means comprises a plurality of switch means each coupled to only one of the plurality of electrodes formed into said at least three electrode planes; and means for providing a set of waveforms to each of said switch means for coupling to the associated electrode.

10. The display as set forth in claim 9, wherein said waveforms are a pair of substantially square waveforms of substantially identical amplitudes and substantially opposite phases.

11. The display as set forth in claim 1, wherein the insulating material between any pair of adjacent electrode planes situated on the same side of the liquid crystal layer is present only in a volume bounded on each side by the area of each of the pair of electrodes.

* * * * *